(12) United States Patent
Anger et al.

(10) Patent No.: US 7,963,481 B2
(45) Date of Patent: Jun. 21, 2011

(54) METHOD AND DEVICE FOR SUPPORTING THE TAKE-OFF ROTATION OF AN AIRCRAFT

(75) Inventors: André Anger, Hamburg (DE); Wolfram Schöne, Buxtehude (DE)

(73) Assignee: Airbus Deutschland GmbH (DE)

( * ) Notice: Subject to any disclaimer, the term of this patent is extended or adjusted under 35 U.S.C. 154(b) by 196 days.

(21) Appl. No.: 11/922,059

(22) PCT Filed: Jun. 13, 2006

(86) PCT No.: PCT/EP2006/005670
§ 371 (c)(1),
(2), (4) Date: Jul. 8, 2009

(87) PCT Pub. No.: WO2006/133902
PCT Pub. Date: Dec. 21, 2006

(65) Prior Publication Data
US 2009/0272844 A1    Nov. 5, 2009

(30) Foreign Application Priority Data
Jun. 14, 2005   (DE) .................. 10 2005 027 385

(51) Int. Cl.
*B64C 25/08* (2006.01)
(52) U.S. Cl. ................. 244/102 R; 244/63; 244/104 FP
(58) Field of Classification Search .......... 244/102 R, 244/102 SS, 63, 104 R, 104 FP
See application file for complete search history.

(56) References Cited

U.S. PATENT DOCUMENTS

| 2,659,555 | A | | 11/1953 | Schlender |
| 4,412,665 | A | * | 11/1983 | Kramer et al. ............. 244/102 R |
| 4,638,962 | A | | 1/1987 | Gunter et al. |
| 4,687,158 | A | * | 8/1987 | Kettering ................. 244/102 R |
| 2003/0080243 | A1 | | 5/2003 | Hoisignton et al. |

FOREIGN PATENT DOCUMENTS

| CH | 239 875 A | 11/1945 |
| EP | 1 041 001 A2 | 10/2000 |
| EP | 1 437 298 A | 7/2004 |
| GB | 351 896 A | 7/1931 |
| GB | 1 593 393 A | 7/1981 |
| RU | 2128175 C1 | 3/1999 |

* cited by examiner

*Primary Examiner* — Galen Barefoot
(74) *Attorney, Agent, or Firm* — Lerner, David, Littenberg, Krumholz & Mentlik, LLP

(57) ABSTRACT

A method and a device for supporting the take-off rotation of an aircraft, which aircraft comprises on each side of the aircraft at least two main landing gear units, arranged one behind the other, which main landing gear units comprising wheels. For supporting the take-off rotation, in at least one rear pair of the main landing gear units the distance between the wheels of these rear main landing gear units, which wheels roll on the ground, and the fuselage, may actively be reduced.

16 Claims, 2 Drawing Sheets

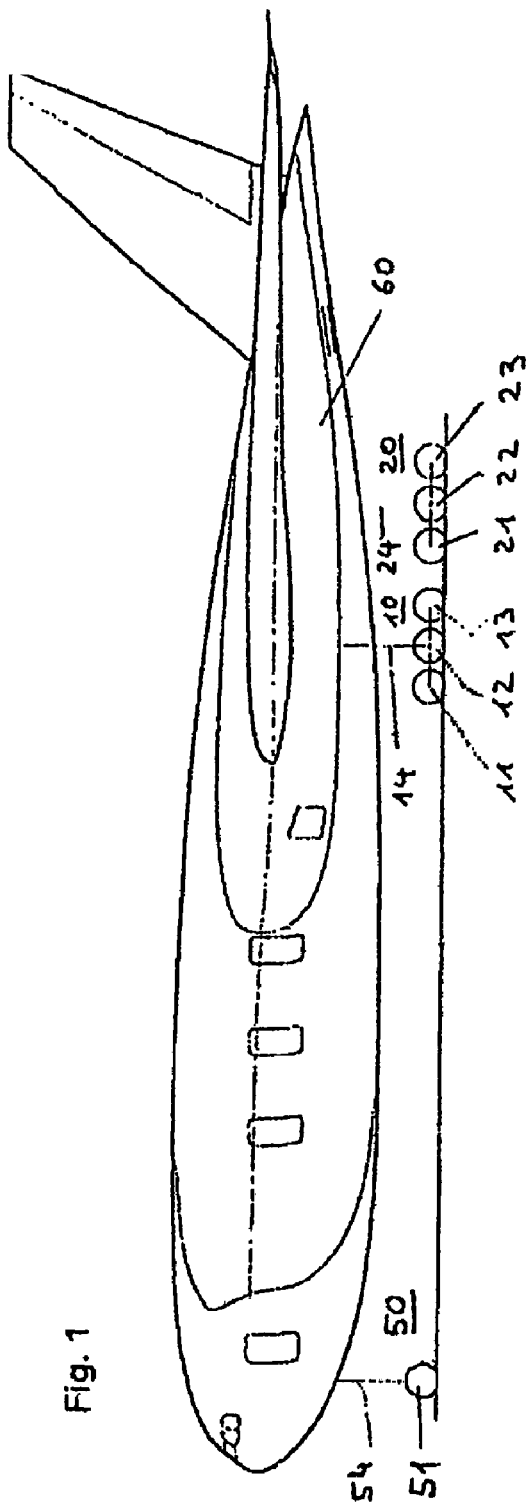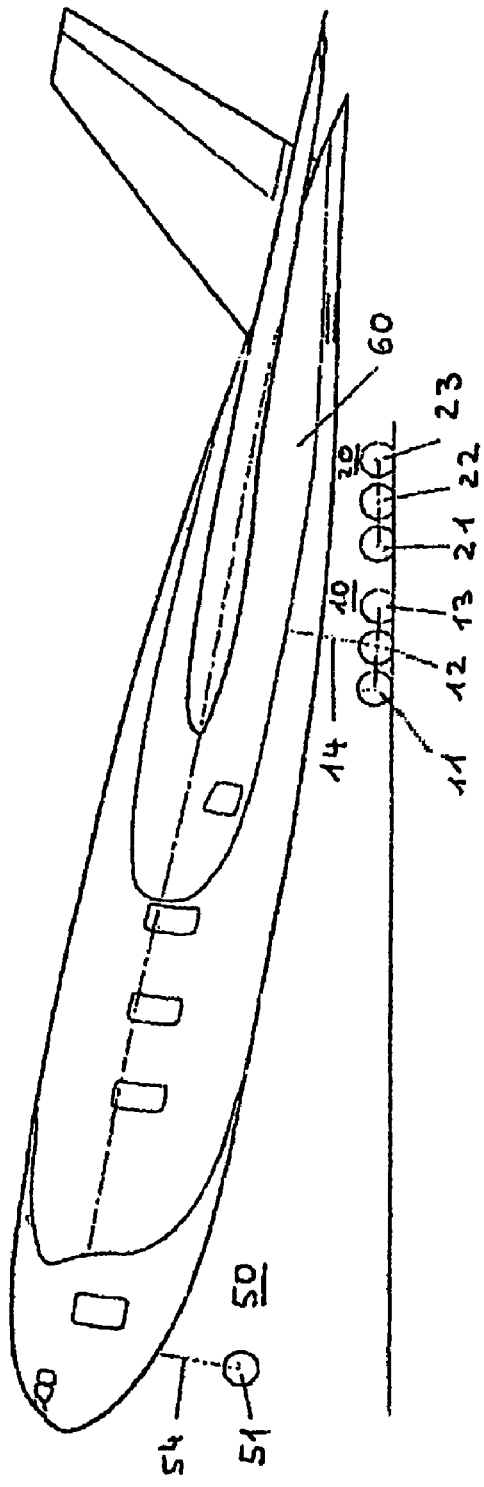

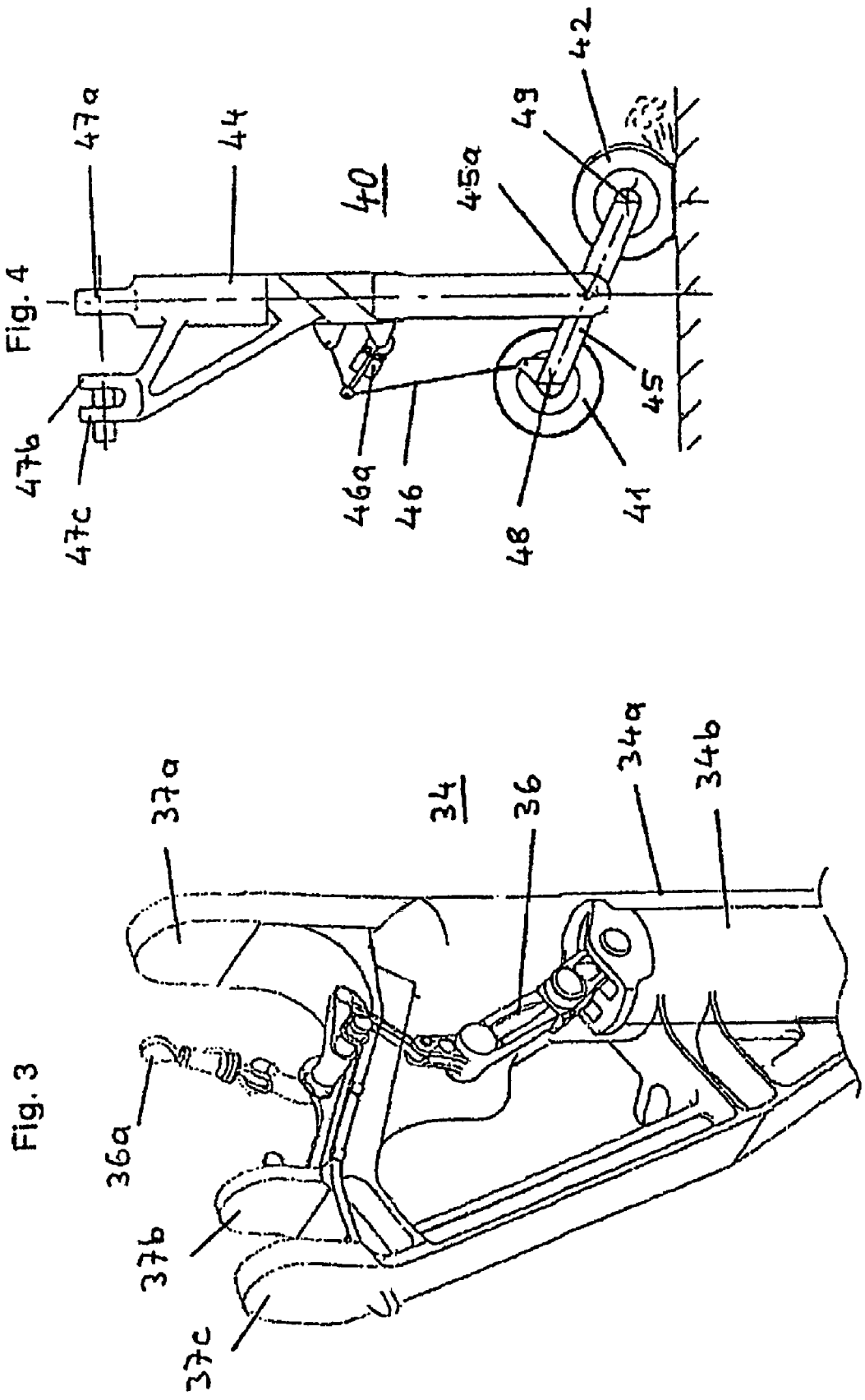

METHOD AND DEVICE FOR SUPPORTING THE TAKE-OFF ROTATION OF AN AIRCRAFT

REFERENCE TO RELATED APPLICATIONS

This application claims the benefit of the filing date of the German Patent Application No. 10 2005 027 385.8 filed Jun. 14, 2005, the disclosure of which is hereby incorporated herein by reference.

FIELD OF THE INVENTION

The invention relates to a method for supporting the take-off rotation of an aircraft and a device for supporting the take-off rotation of an aircraft.

TECHNOLOGICAL BACKGROUND

In the case of large aircraft with a heavy take-off weight there is typically a clear functional separation of the wing and the payload cabin (fuselage). At the end of the fuselage, as far as possible at a large distance from the wing, control surfaces (tail sections) are provided which control the aircraft on its vertical axis and its transverse axis. In this arrangement the elevator unit among other things also has the task of initiating aircraft rotation during take-off, i.e. during the take-off roll procedure to cause rotation of the aircraft on its transverse axis, as a result of which rotation the wing is set at an angle and thus the lift for lift-off is increased.

However, in futuristic projects relating to aircraft, in which in the sense of a so-called "wing-only type design" the payload volume is predominantly installed in the wing region, a configuration results with relatively short lever arms to the elevator control surfaces and rudder control surfaces, in relation to the position of the centre of gravity of mass or the centre of gravity of surface. As a consequence of this, with the same size area, in such an aircraft design the torque of the elevator control surfaces, which torque causes take-off rotation, is less than is the case in a conventional design.

For a large aircraft, in which for reasons of the very heavy maximum take-off weight on each side at least two multi-axis main landing gear units are arranged one behind the other, initiation of take-off rotation would require a disproportionately large and thus heavy elevator control surface, whose oversize would not be required for the actual flight manoeuvres.

In the case of aircraft that feature multi-axis main landing gear units or that, for example as a result of the size and position of the engines, feature particularly long landing gear legs, from the state of the art devices are known which are used to lower or shorten the landing gear legs before or during the retraction procedure. In this way improved loadability and/or improved stowability in the landing gear bay are/is to be provided. Such solutions are known from the Concorde or the AIRBUS A340.

Conversely, it is also known in the case of main landing gear units which for reasons of weight or for reasons of retraction geometry comprise relatively short landing gear legs, by means of special provisions to rotate the landing gear undercarriage in such a way that during take-off and landing at least the wheels of the rearmost axes are guided closer to the ground than the other wheels so as to allow adequate rotation angles (so-called rocking undercarriage).

Furthermore, hydraulic balance systems for landing gear units of aircraft, e.g. Boeing 747, are known by means of which systems, according to the principle of communicating pipes, during rotation that is initiated by the elevator unit, hydraulic pressure equalisation between the more heavily loaded and the less heavily loaded landing gear legs is automatically brought about. However, these systems operate reactively rather than being actively controlled for initiating take-off rotation.

Moreover, from the literature, devices may be known for aircraft with multi-axis main landing gear units, which devices are designed to overcome the difficulties in relation to take-off rotation in that in the initial phase of the take-off roll procedure, up to a defined rate of roll, lift-generating surfaces such as trailing edge flaps are deliberately not employed, and/or in that even lift-spoiling surfaces (spoilers) are extended until a defined lift-off speed is reached, at which point conversely as soon as practicable both the high-lift devices are extended and the spoilers are retracted. In this way fast generation of strong lift is initiated, which is however not very comfortable for passengers, which lift is adequate to take off more or less vertically until the elevator control surfaces are aerodynamically sufficiently effective to manage further rotation (direct lift control). Apart from the lift behaviour that is uncomfortable for passengers, this take-off procedure is associated with disadvantages of high resistance and thus high fuel consumption.

SUMMARY OF THE INVENTION

Among other thinks, it may be an object of the invention to state an improved method and an improved device for supporting the take-off rotation of an aircraft, in which on each side at least two multi-axis main landing gear units are arranged one behind the other.

This object is met by a method with the characteristics disclosed herein.

Moreover, this object is met by a device with the characteristics disclosed herein.

Advantageous embodiments and improvements of the method and the device according to the invention are also disclosed.

The invention provides a method for supporting the take-off rotation of an aircraft which on each side comprises at least two main landing gear units, one behind the other, comprising wheels. According to the invention, for supporting the take-off rotation, in at least one rear pair of the main landing gear units the distance between the wheels that roll on the ground, and the fuselage, is reduced.

An advantageous embodiment of the method according to the invention provides for the reduction in the distance between the wheels that roll on the ground, and the fuselage, of the at least one rear pair of the main landing gear units, to be achieved by shortening the effective length of the landing gear legs of these rear main landing gear units.

According to an advantageous embodiment of the method according to the invention, shortening of the effective length of the landing gear legs of the rear main landing gear units takes place by telescopic pushing together of the landing gear legs.

According to another advantageous embodiment of the method according to the invention, the reduction in the distance between the wheels, that roll on the ground, of the pairs, of which pair there is at least one, and the fuselage, of the main landing gear units, is achieved by pivoting, on a transverse axis, undercarriages that carry the wheels on axes arranged one behind the other.

This arrangement preferably provides for the distance between the rear wheels that roll on the ground, and the fuselage, to be shortened when the undercarriages are pivoted on the transverse axis while the front wheels, which previously were raised, are lowered to the ground.

An advantageous embodiment of the method according to the invention provides for the reduction in the effective length of the landing gear legs or for the pivoting of the undercarriages to take place in a mechanical way.

Another advantageous embodiment of the method according to the invention provides for the reduction in the effective length of the landing gear legs or for the pivoting of the undercarriages to take place in a hydraulic way.

A particularly advantageous embodiment of the method according to the invention provides for the reduction in the effective length of the landing gear legs or for the pivoting of the undercarriages to take place by means of an actively controlled hydraulics balance system that is connected between the front main landing gear units and the rear main landing gear units.

A preferred embodiment of the method according to the invention provides for the aircraft on each side to comprise two main landing gear units, arranged one behind the other, wherein for supporting take-off rotation, in the rear pair of the main landing gear units the distance between the wheels that roll on the ground, and the fuselage, is reduced.

Furthermore, the invention provides a device for supporting the take-off rotation of an aircraft which on each side comprises at least two main landing gear units, arranged one behind the other, comprising wheels. The invention provides for at least one rear pair of the main landing gear units to be designed such that for supporting the take-off rotation the distance between the wheels of these rear main landing gear units, which wheels roll on the ground, and the fuselage, may be reduced.

According to an advantageous embodiment of the device according to the invention, for a reduction in the distance between the wheels that roll on the ground, and the fuselage, of the at least one rear pair of the main landing gear units, the landing gear legs of these rear main landing gear units are designed such that their effective length may be reduced.

The landing gear legs of the rear main landing gear units may be of telescopic design.

According to another advantageous embodiment of the device according to the invention, for a reduction in the distance between the wheels that roll on the ground, and the fuselage, of the pair of the main landing gear units, of which pair there is at least one, undercarriages that carry the wheels on axes arranged one behind the other are pivotable on a transverse axis.

This arrangement preferably provides for the distance between the rear wheels that roll on the ground, and the fuselage, to be shortened when the undercarriages are pivoted on the transverse axis, while the front wheels, which previously were raised, are lowered to the ground.

An advantageous embodiment of the device according to the invention provides for a mechanical device for reducing the effective length of the landing gear legs or for pivoting the undercarriages.

Another advantageous embodiment of the device according to the invention provides for a hydraulic device for reducing the effective length of the landing gear legs or for pivoting the undercarriages.

An advantageous embodiment of the device according to the invention provides for an actively controlled hydraulics balance system, which for reducing the effective length of the landing gear legs or for pivoting the undercarriages is connected between the front main landing gear units and the rear main landing gear units.

A preferred embodiment of the device according to the invention provides for the aircraft on each side to comprise two main landing gear units, arranged one behind the other, wherein, for supporting the take-off rotation, in the rear pair of the main landing gear units the distance between the wheels that roll on the ground, and the fuselage, may be reduced.

BRIEF DESCRIPTION OF THE DRAWINGS

Below, the embodiments according to the invention are explained with reference to the drawings.

In the drawings:

FIG. 1 shows a lateral view of an aircraft on the ground, which aircraft on each side comprises at least two main landing gear units, arranged one behind the other, according to one exemplary embodiment of the invention;

FIG. 2 shows a lateral view of an aircraft during the take-off rotation procedure, which aircraft on each side comprises at least two main landing gear units, arranged one behind the other, according to one exemplary embodiment of the invention;

FIG. 3 shows a perspective view of part of a landing gear leg with a device for reducing the effective length of said landing gear leg as may be used according to the invention; and FIG. 4 shows a schematic diagram of a landing gear unit in which for reducing the distance between the wheels that roll on the ground, and the fuselage, undercarriages that carry the wheels on axes arranged one behind the other are pivotable on a transverse axis (rocking undercarriages) as may be used according to the invention.

DETAILED DESCRIPTION OF EXEMPLARY EMBODIMENTS

In various figures the same reference characters are used for identical or similar components. The illustrations in the figures are diagrammatic and not to scale.

FIGS. 1 and 2 show a lateral view of an aircraft according to a futuristic wing-only type design that shows a nose undercarriage 50 and on each aircraft side two main landing gear units 10, 20, arranged one behind the other, with the aircraft on the ground and during the take-off rotation procedure respectively.

The nose undercarriage 50 comprises wheels 51, arranged on a landing gear leg 54, while the main landing gear units 10, 20 comprise respective landing gear legs 14, 24 on which wheels 11, 12, 13 and 21, 22, 23 are provided.

To support take-off rotation the invention provides for the distance between the wheels 21, 22, 23 that roll on the ground, of the rear pair 20 of the main landing gear units 10, 20, and the fuselage 60, to be actively reduced. In this way the take-off rotation of the aircraft, as shown in FIG. 2, is brought about. In the exemplary embodiment shown, the reduction in the distance between the wheels 21, 22, 23 that roll on the ground, of the rear pair 20 of the main landing gear units 10, 20, and the fuselage 60, can for example be brought about by shortening the effective length of the landing gear legs 24 of the rear main landing gear units 20 by telescopic pushing together of the landing gear legs 24.

FIG. 3 shows a perspective view of part of a landing gear leg 34 with a device, known per se, for reducing the effective length of said landing gear leg 34 as may be used according to the invention. The landing gear leg 34 comprises an external tube 34a, which by means of attachment eyes 37a, 37b, 37c, in a manner known per se, for the purpose of retracting the landing gear is pivotably held on the aircraft structure (not shown). In the external tube 34a an internal tube 34b is arranged which may be telescopically slid against said external tube 34a. Telescopic pushing together of the tubes 34a, 34b is effected by a lever mechanism 36. Said lever mechanism 36 may be hydraulically or mechanically actuated by way of a connection 36a.

FIG. 4 shows a schematic diagram of a landing gear unit 40 in which wheels 41, 42 in a undercarriage 45 are rotatably held on axes 48, 49 that are arranged one behind the other. For retracting the landing gear the landing gear leg 44 of the landing gear unit 40 is rotatably held on the aircraft structure (not shown) by means of attachment eyes 47a, 47b, 47c in a way that is known per se.

For reducing the distance between the wheels 42 that roll on the ground, and the fuselage, the undercarriage 45 is pivotable on a transverse axis 45a (so-called rocking undercarriage). During pivoting the undercarriage 45 on the transverse axis 45a, the distance between the rear wheels 42 that roll on the ground, and the fuselage 60, is reduced while at the same time the front wheels 41, which previously were raised, are lowered to the ground. This has the effect of reducing the distance between the wheels 42 of the rear main landing gear unit 40, which wheels roll on the ground, and the fuselage 60, and thus of supporting the take-off rotation. The reduction in the distance is actively effected, using a suitable actuating device, by means of a lever mechanism 46. The actuating device may operate hydraulically or mechanically. The exemplary embodiment shown in FIG. 4 provides for a hydraulic actuator 46a by means of which the lever mechanism 46 is operated.

Reducing the effective length of the landing gear legs 24; 34; 44 or pivoting the undercarriages 45 may also be effected by means of an actively controlled hydraulic balance system which is connected between the front main landing gear units 10 and the rear main landing gear units 20; 40. Such a hydraulic balance system acts on the associated hydraulic actuators that are provided on the main landing gear units 10, 20; 40.

Preferably, as shown in FIGS. 1 and 2, on each side the aircraft comprises two main landing gear units 10, 20; 40, arranged one behind the other. These are used to carry a heavy take-off weight of the aircraft. For supporting the take-off rotation, in the rear pair 20; 40 of the main landing gear units 10, 20; 40, the distance between the wheels 21, 22, 23; 42 that roll on the ground, and the fuselage 60, is reduced, as shown in FIG. 2.

Instead of applying to the wing-only type design shown in FIGS. 1 and 2, the invention may of course also be applied to an aircraft with a conventional wing geometry.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE CHARACTERS

10 Main landing gear unit
11 Wheel
12 Wheel
13 Wheel
14 Landing gear leg
20 Main landing gear unit
21 Wheel
22 Wheel
23 Wheel
24 Landing gear leg
34 Landing gear leg
34a External tube
34b Internal tube
36 Lever mechanism
36a Connection
37a Attachment eye
37b Attachment eye
37c Attachment eye
40 Main landing gear unit
41 Wheel
42 Wheel
44 Landing gear leg
45 Undercarriage
45a Transverse axis
46 Lever mechanism
46a Hydraulic actuator
47a Attachment eye
47b Attachment eye
47c Attachment eye
48 Axis
49 Axis
50 Nose undercarriage
51 Wheel
54 Landing gear leg
60 Fuselage

What is claimed is:

1. A method for supporting the take-off rotation of an aircraft which on each side comprises at least two main landing gear units, arranged one behind the other, comprising wheels, wherein each of the main landing gear units of a rear pair of the at least two main landing gear units comprises at least a front wheel and a rear wheel in an undercarriage which are rotatably held on respective axes and arranged one behind the other, wherein, for supporting the take-off rotation, in the at least one rear pair of the main landing gear units, the distance between the rear wheels that roll on the ground, and the fuselage is actively reduced;

wherein the reduction of the distance between the rear wheels of the at least one pair of the main landing gear units, which wheels roll on the ground, and the fuselage is achieved by pivoting the supporting undercarriages on a transverse axis, wherein the front and rear wheels are arranged on axes which axes are arranged one behind the other on the undercarriages.

2. The method of claim 1, wherein the rear main landing gear units comprise landing gear legs; and wherein the reduction in the distance between the wheels that roll on the ground, and the fuselage, of the at least one rear pair of the main landing gear units is achieved by shortening the effective length of the landing gear legs of these rear main landing gear units.

3. The method of claim 2, wherein shortening of the effective length of the landing gear legs of the rear main landing gear units takes place by telescopic pushing together of the landing gear legs.

4. The method of claim 1, wherein during pivoting the undercarriages on the transverse axis the distance between the rear wheels that roll on the ground, and the fuselage, is reduced, while at the same time the front wheels, which previously were raised, are lowered to the ground.

5. The method of claim 2, wherein the reduction in the effective length of the landing gear legs or the pivoting of the undercarriages takes place in a mechanical way.

6. The method of claim 2, wherein the reduction in the effective length of the landing gear legs or the pivoting of the undercarriages takes place in a hydraulic way.

7. The method of claim 6, wherein the reduction in the effective length of the landing gear legs or the pivoting of the undercarriages takes place by an actively controlled hydraulics balance system that is connected between the front main landing gear units and the rear main landing gear units.

8. The method of claim 1, wherein the aircraft on each side comprises two main landing gear units, arranged one behind the other, wherein, for supporting take-off rotation, in the rear pair of the main landing gear units the distance between the wheels that roll on the ground, and the fuselage, is reduced.

9. A device for supporting the take-off rotation of an aircraft which on each side comprises at least two main landing gear units comprising wheels, wherein the at least two main landing gear units are arranged one behind the other, wherein each of the main landing gear units of a rear pair of the at least two main landing gear units comprises at least a front wheel and a rear wheel in an undercarriage which are rotatably held on respective axes and arranged one behind the other, wherein the at least one rear pair of the main landing gear units is designed in such a way that for supporting the take-off rotation the distances between the rear wheels of these rear main landing gear units, which wheels roll on the ground, and the fuselage, are actively reduceable;

wherein for a reduction of the distance between the rear wheels of the at least one pair of the main landing gear units, which wheels roll on the ground, and the fuselage, undercarriages are pivotable on a transverse axis, wherein the undercarriages carry the front and rear wheels on axes, which axes are arranged one behind the other.

10. The device of claim 9, wherein the rear main landing gear units comprise landing gear legs; and wherein for a reduction of the distance between the wheels of the at least one rear pair of the main landing gear units, which wheels roll on the ground, and the fuselage, the landing gear legs of these rear main landing gear units are designed in such a way that their effective length is reduceable.

11. The device of claim 10, wherein the landing gear legs of the rear main landing gear units are formed in a telescopically way.

12. The device of claim 8, wherein the distance between the rear wheels that roll on the ground, and the fuselage, is shortened when the undercarriages are pivoted on the transverse axis, while the front wheels, which previously were raised, are lowered to the ground.

13. The device of claim 9, wherein a mechanical device for reducing the effective length of the landing gear legs or for pivoting the undercarriages is provided.

14. The device of claim 10, wherein a hydraulic device for reducing the effective length of the landing gear legs or for pivoting the undercarriages is provided.

15. The device of claim 14, wherein an actively controlled hydraulic balance system is connected between the front main landing gear units and the rear main landing gear units, which actively controlled hydraulic balance system is adapted for reducing the effective length of the landing gear legs or for pivoting the undercarriages.

16. The device of claim 9, wherein the aircraft on each side comprises two main landing gear units which are arranged one behind the other, wherein, for supporting the take-off rotation, in the rear pair of the main landing gear units the distance between the wheels that roll on the ground, and the fuselage, is reduceable.

* * * * *